United States Patent [19]
Park

[11] Patent Number: 6,061,082
[45] Date of Patent: May 9, 2000

[54] SYSTEM AND METHOD FOR TAKING A SURVEY OF AN AUDIENCE TO DETERMINE A RATING USING INTERNET TELEVISION

[75] Inventor: Jong-Baek Park, Seoul, Rep. of Korea

[73] Assignee: Samsung Electronics Co., Ltd., Kyungki-do, Rep. of Korea

[21] Appl. No.: 09/050,255

[22] Filed: Mar. 30, 1998

[30] Foreign Application Priority Data

Aug. 28, 1997 [KR]   Rep. of Korea ...................... 97-41880

[51] Int. Cl.⁷ ................................................. H04N 7/10
[52] U.S. Cl. ...................................... 348/1; 348/2; 455/2
[58] Field of Search .................................. 348/1, 2, 478, 348/473, 12, 13, 7; 455/2, 6.3; 345/327, 328

[56] References Cited

U.S. PATENT DOCUMENTS

| | | | |
|---|---|---|---|
| 5,557,320 | 9/1996 | Krebs | 455/6.3 |
| 5,715,315 | 2/1998 | Handelman | 455/6.3 |
| 5,778,182 | 7/1998 | Cathey et al. | 348/1 |
| 5,818,441 | 10/1998 | Throckmorton et al. | 345/328 |
| 5,884,284 | 3/1999 | Peters et al. | 348/1 |

*Primary Examiner*—Victor R. Kostak
*Attorney, Agent, or Firm*—Sughrue, Mion, Zinn, Macpeak & Seas, PLLC

[57] ABSTRACT

An internet TV system for automatically taking a survey of an audience to determine a rating of specified TV channels and during specified time periods. The internet TV system includes a broadcasting station and at least two internet TV receivers. The broadcasting station encodes a viewing channel search command into a TV broadcasting signal and broadcasts the TV broadcasting signal. The internet TV receivers decode the TV broadcasting signal received from the broadcasting station. If the decoded TV broadcasting signal includes the viewing channel search command, the internet TV receivers write electronic mails including currently viewed channels, and transmit the electronic mails to the broadcasting station. Then, the broadcasting station determines the audience rating based on the electronic mails received from the internet TV receivers.

7 Claims, 5 Drawing Sheets

(From) : jbpark @ sec. co. kr
(To) : channel @ kbs. co. kr
(Subject) : 9

Contents :

FIG. 5

SYSTEM AND METHOD FOR TAKING A SURVEY OF AN AUDIENCE TO DETERMINE A RATING USING INTERNET TELEVISION

BACKGROUND OF THE INVENTION

1. Field of the Invention

The present invention relates to a television (TV) broadcasting system, and in particular, to a system and method for taking a survey to determine audience rating using an internet television. The present application is based upon Korean Application No. 41880/1997, which is incorporated herein by reference.

2. Description of the Related Art

Nowadays, almost every television broadcasting station and audience rating survey institute regularly takes surveys of audiences to determine ratings of specified TV channels during specified time periods. The survey results are used to determine advertising rates of specified time periods, or to reorganize a broadcasting program. A known technique for taking a survey of the audience to determine ratings involves telephoning a limited random sample of homes and asking which channel is currently being viewed. Such a random sample survey requires a lot of money and time. Further, this survey technique may be relatively inaccurate due to insincere answers to inquiries, and time intervals between the surveys may be restricted.

SUMMARY OF THE INVENTION

It is therefore an object of the present invention to provide a system and method for automatically taking a survey of an audience to determine ratings using an internet TV receiver.

According to one aspect of the present invention, a method for taking a survey of an audience to determine a rating, via an internet TV system including a broadcasting station and at least two internet TV receivers, includes transmitting a viewing channel search command from the broadcasting station to the internet TV receivers. Upon receiving the viewing channel search command, the internet TV receivers write electronic mails including notifications of currently viewed channels, and transmit the electronic mails to the broadcasting station. The broadcasting station calculates the audience rating based on the electronic mails received from the internet TV receivers.

According to another aspect of the present invention, an internet TV system for taking a survey of an audience to determine a rating comprises a broadcasting station and at least two internet TV receivers. The broadcasting station encodes a viewing channel search command into a TV broadcasting signal and broadcasts the TV broadcasting signal to the internet TV receivers. If the TV broadcasting signal received by the internet TV receivers includes the viewing channel search command, the internet TV receivers decode the received TV broadcasting signal, write electronic mails including notification of currently viewed channels, and transmit the electronic mails to the broadcasting station. The broadcasting station then calculates the audience rating according to the electronic mails received from the internet TV receivers.

BRIEF DESCRIPTION OF THE DRAWINGS

The above and other objects, features and advantages of the present invention will become more apparent in light of the following detailed description of an exemplary embodiment thereof taken with the attached drawings in which:

FIG. 5 shows an example electronic mail including a notification of a viewing channel according to the preferred embodiment of the present invention.

DETAILED DESCRIPTION OF THE PREFERRED EMBODIMENT

Figure 1:
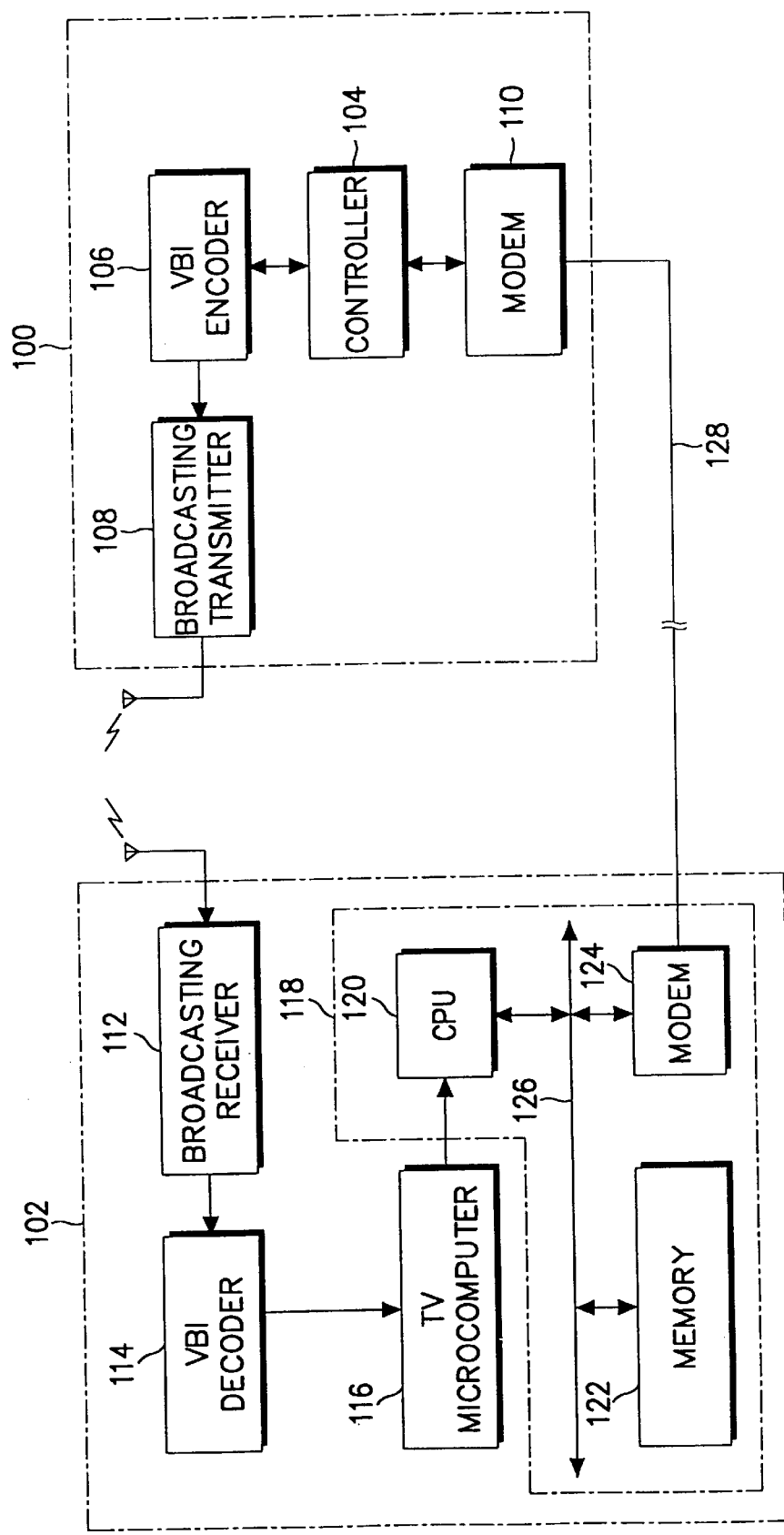
FIG. 1 shows a schematic block diagram of an internet TV system for taking a survey of an audience to determine ratings according to an embodiment of the present invention.

Referring to FIG. 1, an internet TV system according to the present invention includes a broadcasting station 100, and an internet TV receiver 102 connected to the broadcasting station 100 via a telephone line 128 of a public switched telephone network (PSTN). In the broadcasting station 100 and the internet TV receiver 102, descriptions on construction which is not directly related to the gist of the present invention may be omitted. Further, the number of the broadcasting stations 100 and the internet TV receivers 102 is not limited.

The broadcasting station 100 includes a controller 104, a VBI (vertical blanking interval) encoder 106, a broadcasting transmitter 108, and a modem (modulator-demodulator) 110. The controller 104, which is a main controller of the broadcasting station 100, provides the VBI encoder 106 with a viewing channel search command to broadcast the command together with a broadcasting signal, and receives a viewing channel notification (electronic mail) transferred from the internet TV receiver 102 via the modem 110 to calculate the audience rating. The VBI encoder 106 encodes the viewing channel search command received from the controller 104 into a TV broadcasting signal, and transfers the TV broadcasting signal to the broadcasting transmitter 108. The broadcasting transmitter 108 modulates the TV broadcasting signal received from the VBI encoder 106 in a known manner, and transmits the modulated TV broadcasting signal via an antenna.

Figure 2:
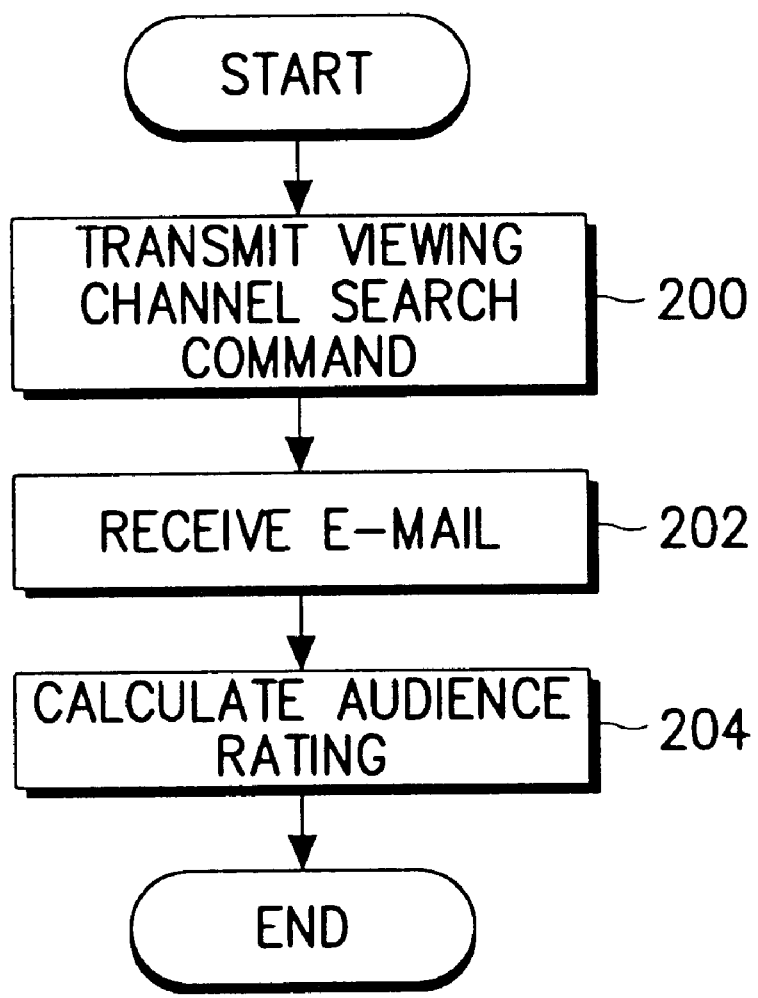
FIG. 2 shows a control process of the controller (104) in the broadcasting station (100) of FIG. 1.

FIG. 2 shows a control procedure of the controller 104 in the broadcasting station 100 according to the present invention. With reference to FIG. 2, the controller 104 transfers, at step 200, the viewing channel search command to the VBI encoder 106 at either a predetermined time interval or in response to a key input by an operator. In this way, the viewing channel search command encoded by the VBI encoder 106 is loaded on (or inserted into) the TV broadcasting signal and transmitted to the internet TV receiver 102 via the antenna.

Referring back to FIG. 1, the internet TV receiver 102 includes a broadcasting receiver 112, a VBI decoder 114, a TV microcomputer 116, and an internet module 118. The broadcasting receiver 112 receives the TV broadcasting signal transmitted from the broadcasting station 100 via an antenna, and demodulates the received TV broadcasting signal. An output signal of the broadcasting receiver 112 is processed in a known manner and output to a cathode ray tube (CRT; not shown) and a speaker (not shown). The output signal of the broadcasting receiver 112 is also transmitted to the VBI decoder 114. The VBI decoder 114 decodes the signal transmitted from the broadcasting receiver 112 so as to extract the viewing channel search command previously inserted into the TV broadcasting signal. Here, if the VBI decoded data includes the viewing channel search command, the VBI decoded data is transmitted to the TV microcomputer 116.

The internet TV receiver 102 performs a general TV function as well as an internet function using the internet module 118, under the control of the TV microcomputer 116. In addition, the TV microcomputer 116 performs the viewing channel notification function according to the present invention.

Figure 3:
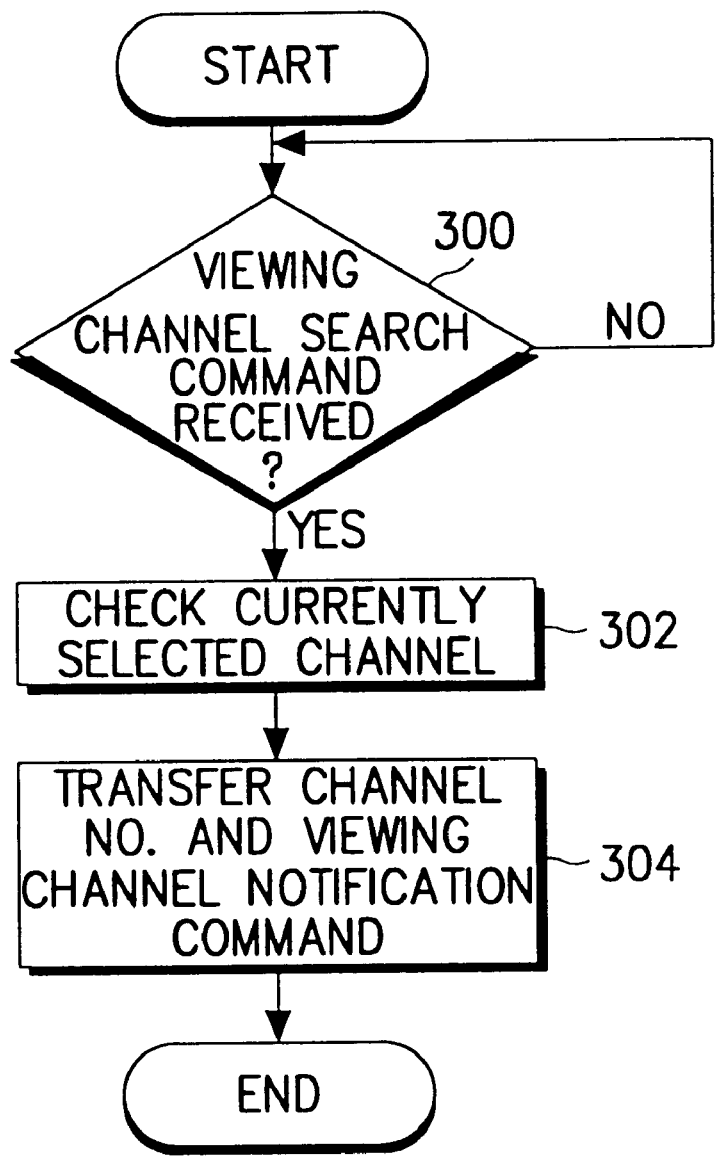
FIG. 3 shows a control process of the TV microcomputer (116) in the internet TV receiver (102) of FIG. 1.

FIG. 3 shows a control process of the TV microcomputer 116 according to the preferred embodiment of the present invention. With reference to FIG. 3, the TV microcomputer 116 checks, at step 300, whether the viewing channel search command has been received from the broadcasting station 100. If the viewing channel search command has been received, at step 302, the TV microcomputer 116 checks which channel number is currently selected by a tuner (not shown). At step 304, the TV microcomputer 116 transfers the currently selected channel number and the viewing channel notification command to a CPU (central processing unit) 120 of the internet module 118, and completes the procedure.

The internet module 118 includes the CPU 120, a memory 122, and a modem 124 connected to one another via a bus line 126. The modem 124 is connected to the broadcasting station 100 via the telephone line 128. The CPU 120 communicates with the TV microcomputer 116 and performs the internet search function via the modem 124. The memory 122 stores a control program of the CPU 120 and various reference data. Further, the memory 122 temporarily stores data (e.g., data of the e-mail) generated in the course of executing the control program of the CPU 120. The modem 124 telephones the broadcasting station 100 under the control of the CPU 120, and modulates/demodulates signals transmitted to and received from the broadcasting station 100 via the telephone line 128.

Figure 4:
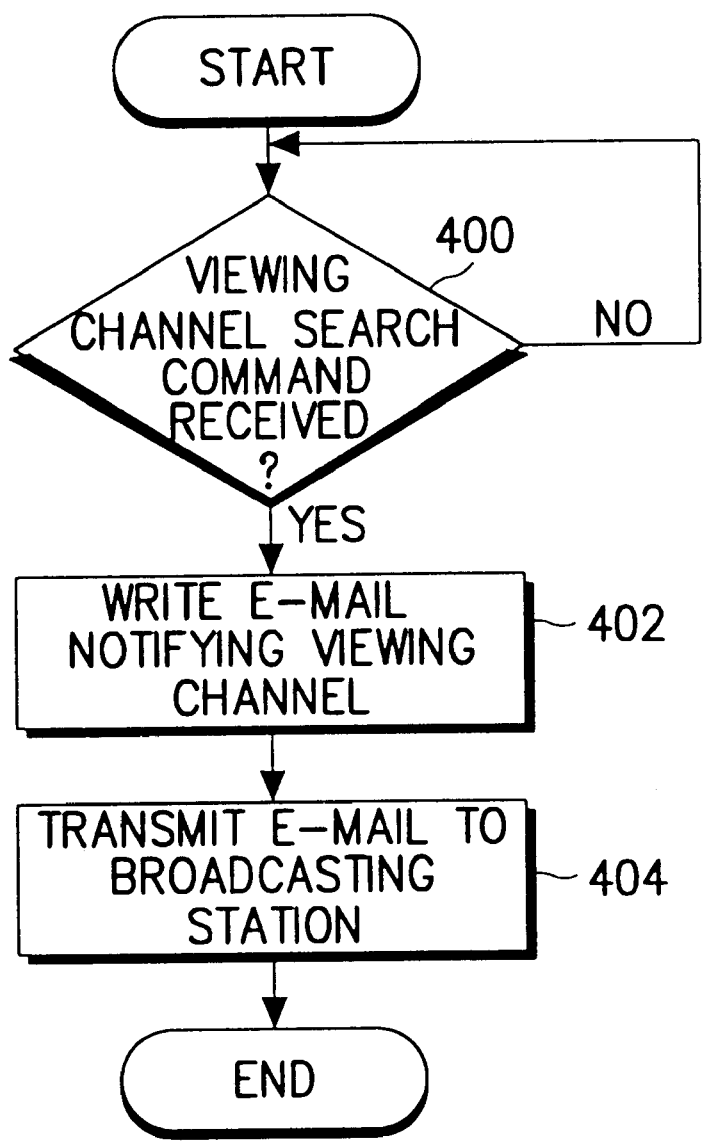
FIG. 4 shows a control process of the CPU (120) in the internet module (118) of FIG. 1.

FIG. 4 shows a control process of the CPU 120 according the preferred embodiment of the present invention. With reference to FIG. 4, the CPU 120 checks at step 400 whether the viewing channel search command has been received from the TV microcomputer 116. If the viewing channel search command has been received, the CPU 120 writes an e-mail including notification of the current viewing channel at step 402. Then, the CPU 120 transmits the e-mail to the broadcasting station 100 via the modem 124 at step 404, and completes the procedure.

As shown in FIG. 5, the viewing channel notification e-mail includes an e-mail address of a user of the internet TV receiver 102 (i.e., a sender), and an e-mail address of the broadcasting station 100 (i.e., a receiver). A number "9" displayed after "subject" indicates that the e-mail is the viewing channel notification e-mail, with the viewing channel number written in the "contents" area.

In the meantime, at step 202 of FIG. 2, the controller 104 of the broadcasting station 100 receives the viewing channel notification e-mail transferred from the internet TV receiver 102 via the modem 110. Thereafter, at step 204, the controller 104 totals the e-mails received from the respective internet TV receivers 102, and completes the procedure. Here, the audience rating of a particular channel is determined by dividing the number of received e-mails for a particular channel by the total number of the received e-mails.

In this manner, the broadcasting station 100 can automatically take a survey of the audience to determine a rating. Accordingly, it is possible to reduce the cost and time required to survey an audience, and enhance the accuracy of the survey. Further, it is possible to freely change the time interval between the surveys.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims. For example, the present invention is also applicable to a cable TV system.

What is claimed is:

1. A method for taking a survey of an audience to determine an audience rating, in an internet TV system that includes a broadcasting station and at least two internet TV receivers, comprising the steps of:

transmitting a viewing channel search command from said broadcasting station to said internet TV receivers;

writing, upon receiving said viewing channel search command, electronic mails that include notification of currently viewed channels and transmitting said electronic mails from said internet TV receivers to said broadcasting station; and calculating the audience rating based on said electronic mails received by said broadcasting station from said internet TV receivers.

2. A method for taking a survey of an audience according to claim 1, wherein said electronic mails each comprise an electronic mail address of the corresponding internet TV receiver and an electronic mail address of said broadcasting station.

3. A method for taking a survey of an audience according to claim 1, further comprising the steps of:

encoding, in said broadcasting station, said viewing channel search command into a TV broadcasting signal and transmitting said TV broadcasting signal to said internet TV receivers;

decoding, in said internet TV receivers, said TV broadcasting signal transmitted from said broadcasting station;

checking whether said TV broadcasting signal decoded by said internet TV receivers includes said viewing channel search command.

4. A method for taking a survey of an audience according to claim 3, wherein said audience rating is determined by dividing a number of said electronic mails for a specified TV channel by a total number of said electronic mails received by said broadcasting station.

5. An internet TV system for taking a survey of an audience to determine a rating, comprising:

a broadcasting station for encoding a viewing channel search command into a TV broadcasting signal and then broadcasting the TV broadcasting signal; and at least two internet TV receivers for decoding said TV broadcasting signal received from said broadcasting station, and if said decoded TV broadcasting signal includes said viewing channel search command, for writing electronic mails that include notification of currently viewed channels and transmitting said electronic mails to said broadcasting station;

wherein said broadcasting station calculates the audience rating according to said electronic mails received from said internet TV receivers.

6. An internet TV system according to claim 5, wherein said electronic mails each comprise an electronic mail address of the corresponding internet TV receiver, and an electronic mail address of the broadcasting station.

7. An internet TV system according to claim 6, wherein said audience rating is determined by dividing a number of said electronic mails that contain a specified TV channel by a total number of said electronic mails received.

* * * * *